April 27, 1965  H. M. PASSMAN  3,180,653
SUSPENSION SYSTEM FOR A TRANSPORTABLE HUT
Filed June 7, 1962
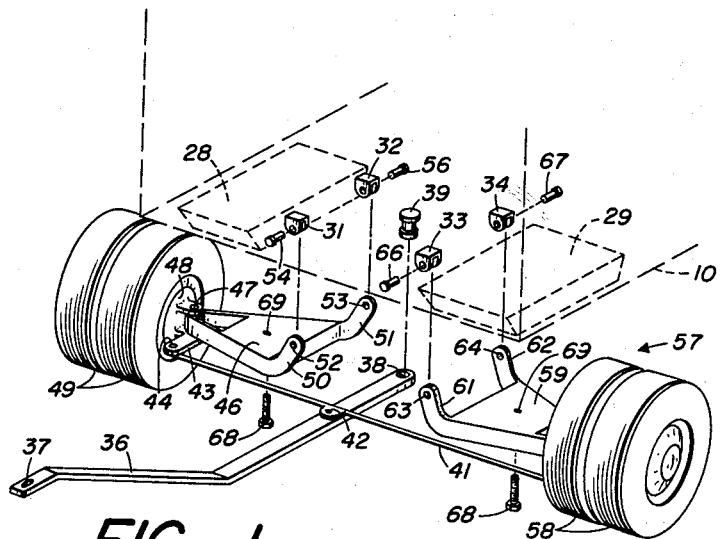
FIG 1
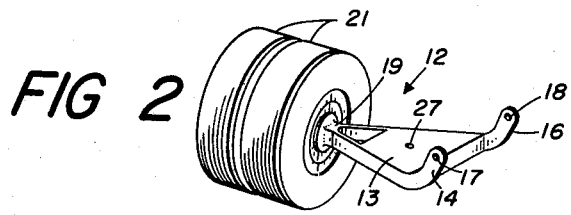
FIG 2
FIG 3
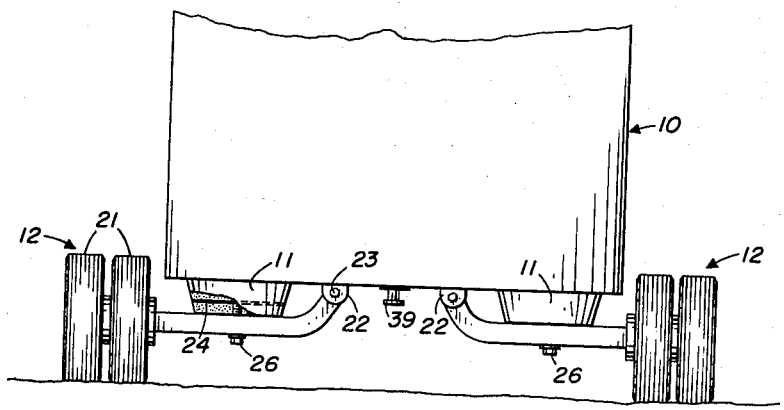
INVENTOR.
HARRY M. PASSMAN
BY
ATTORNEY

United States Patent Office 3,180,653
Patented Apr. 27, 1965

3,180,653
SUSPENSION SYSTEM FOR A
TRANSPORTABLE HUT
Harry M. Passman, Cedar Rapids, Iowa, assignor to Collins Radio Company, Cedar Rapids, Iowa, a corporation of Iowa
Filed June 7, 1962, Ser. No. 200,828
3 Claims. (Cl. 280—30)

This invention relates in general to a suspension system with detachable ground wheels for converting a body into an easily transportable unit.

At times it is desirable to air drop apparatus to troops or others in inaccessible areas. It is generally desirable to package such material in containers which are formed with shock pads on their ground-engaging portions and then to air drop them by helicopter or with suitable parachute means so that the equipment will not be destroyed upon engagement with the ground. It sometimes is desriable to move such equipment after it has been dropped, and this would presently require heavy lifting and transporting equipment of a type not generally available.

It is an object of the present invention to provide quickly- and easily-detachable ground wheels that may be mounted to packages that will render such packages mobile.

Another object of this invention is to provide ground wheels that may be easily attached to a package so as to utilize the existing shock pads mounted on the package.

Further objects, features, and advantages of the invention will become apparent from the following description and claims when read in view of the drawings, in which FIGURE 1 is a perspective view, partially exploded, showing front ground wheels according to the present invention;

FIGURE 2 is a perspective view of a rear wheel unit; and

FIGURE 3 illustrates a pair of ground wheel units attached to an object to be moved.

FIGURE 3 illustrates a package 10 that might be, for example, a helio hut suitable for air dropping by helicopter or by parachute from an aircraft and which has attached to its under portion ground-engaging shock mounts 11. A pair of wheel units designated generally as 12 are attached to the container 10.

Each unit 12 contains a triangular wishbone member 13 which has a pair of upwardly-extending arms 14 and 16 formed with openings 17 and 18 therethrough. A spindle is attached to the other end 19 of wishbone 13 and carries suitable ground wheels 21.

A pair of brackets 22 are attached to the under side of the container 10 adjacent shock mounts 11, and holding means as for example pins 23 may be passed through the brackets 22 and openings 17 and 18 to pivotally attach the members 12 to the under side of the container. A pair of brackets 22 are also attached to the other side of the container 10 to support the second ground-engaging wheel assembly 12. The pads 11 may have mounted therein a holding plate 24 as shown in partial cutaway view in FIGURE 3, into which the quick-attach bolts 26 may be threadably received. Bolt 26 passes through an opening 27 in triangular member 13 and limits the motion between units 12 and container 10.

Thus the unit shown in FIGURE 3 constitutes a pair of rear wheels for the container 10 which are capable of pivoting about pins 23 due to flexure of the shock mounts 11. The ground wheels will normally be mounted to extend beyond the container 10 as shown. The pads 11 serve as spring members to soften the ride of the container.

So as to transform the container 10 into an easily transportable package, front ground wheels are attached to the end of the container opposite the rear wheels. This is illustrated in FIGURE 1.

Container 10 has front shock pads 28 and 29 attached to its under surface. Four brackets 31, 32, 33 and 34 are attached to the container adjacent the shock pads 28 and 29. A front ground unit comprises a drawbar 36 formed with a suitable drawbar opening 37. Drawbar 36 has an opening 38 at its rear end through which a pin 39 may be placed. Pin 39 extends through the floor of the container 10 and serves as a pivot point. A turning link 41 is pivotally connected by pin 42 to the drawbar 36 ahead of pivot point 38 and engages at either end crank arms 43 to which it is pivotally connected by bolts 44.

Crank arms 43 are pivotally supported by triangular frame 46 by a vertical king pin 47. Extensions of crank arms 43 form spindles 48 to which ground wheels 49 are attached.

Triangular member 46 has upwardly-extending arms 50 and 51 which are formed with openings 52 and 53. Pins 54 and 56 are insertable through openings 52 and 53 and openings formed in brackets 31 and 32, respectively.

The second forward ground supporting member is designated generally as 57 and has ground wheels 58 which are mounted on the triangular member 59. Member 59 has upwardly-extending portions 61 and 62 which are formed with openings 63 and 64 through which pins 66 and 67 may be inserted to attach unit 57 to brackets 33 and 34.

Pads 28 and 29 are engaged by the flat portions of the triangular portions 46 and 59 and form a flexible support. As the drawbar 36 is pivoted about pin 39 in the wheels 49 and 58 will be rotated about the vertical axis to allow the unit to be turned. Holding bolts 68 may be inserted through openings 69 is triangular members 46 and 59 to limit the downward movement of the units relative to the container. Such holding bolts extend through pads 28 and 29 and do not prevent the pads from absorbing shock.

Such units may be quickly and easily converted from stationary units to portable ones by merely lifting the container 10 and inserting pins 23 through the rear supporting units and pins 54, 56, 66, and 67 through the forward units.

It is seen that this invention provides an apparatus for easily converting a container from a non-mobile to a mobile unit. Although it has been described wtih respect to preferred embodiments thereof, it is not to be so limited, as changes and modifications may be made therein which are within the full intended scope of the invention as defined by the appended claims.

I claim:

1. In a container and means for converting the container from a nonmobile to a mobile structure to facilitate movement over the ground; a plurality of normally ground engaging support and shock pads secured to the under side of said container for engaging the ground and supporting the container on the ground, and to provide ground engaging shock protection when the container is deposited on the ground by helicopter and when the container is dropped by parachute to the ground; a plurality of suspension means easily attachable to the container and readily removable from the container for conversion of the container between the nonmobile and mobile over the ground state; each of said plurality of suspension means being provided with rotatably mounted ground engaging wheels at an outer end and at the inner end forward and rear spaced longitudinally aligned easily detachable pivot connections with the bottom of the container; and each of said plurality of suspension means being positioned to underlie and abut the bottom of a shock pad for transmission of shock loading imparted to wheels during movement over the ground, through the suspension means to respective shock pads for absorption by the shock pads at each respective suspension means to prevent and minimize damage to the container and the contents of the container.

2. The means for converting a container from a non-mobile to a mobile structure of claim 1, wherein there is a rear pair and a forward pair of said plurality of suspension means; each of said plurality of suspension means being equipped with rotatable wheel mounting spindle means at the outer ends; each of the spindle means of said forward pair of suspension means being provided with a kingpin pivotal mounting connection in the respective suspension means for pivotal steering movement of the spindle and the wheels mounted thereon about the pivotal axis of the respective kingpin connections; crank arm extensions from the spindle of each forward suspension means; a turning link pivotally connected to each of said crank arms and extending from one crank arm connection to the other crank arm connection; and a drawbar having a rear pivotal connection to the container and a pivotal connection to the turning link forwardly spaced from the pivotal connection of the drawbar with the container for steering control of the wheels of the forward pair of suspension means as the drawbar is pivoted about its pivotal connection with the container.

3. The means for converting a container from a non-mobile to a mobile structure of claim 2, wherein shock rebound limiting means is connected through each of the suspension means units and into the respective shock pad units for limiting rebound movement of each suspension means unit when encountering bounce and jostle with movement of the container over the ground.

References Cited by the Examiner
UNITED STATES PATENTS

| | | | |
|---|---|---|---|
| 1,641,700 | 9/27 | Sperry | 244—100 X |
| 1,822,026 | 9/31 | Guy | 267—63 X |
| 1,864,080 | 6/32 | Madge | 267—63 |
| 2,059,212 | 11/36 | Dorst | 280—124 X |
| 2,404,673 | 7/46 | Volf | 244—138 |
| 2,820,642 | 1/58 | Harper | 280—29 |
| 2,917,121 | 12/59 | Hutter et al. | 280—103 X |
| 2,940,769 | 6/60 | Taylor | 280—103 X |

FOREIGN PATENTS

| | | |
|---|---|---|
| 172,124 | 8/52 | Austria. |
| 1,184,353 | 2/59 | France. |

A. HARRY LEVY, *Primary Examiner.*

BENJAMIN HERSH, *Examiner.*